United States Patent Office 2,750,584

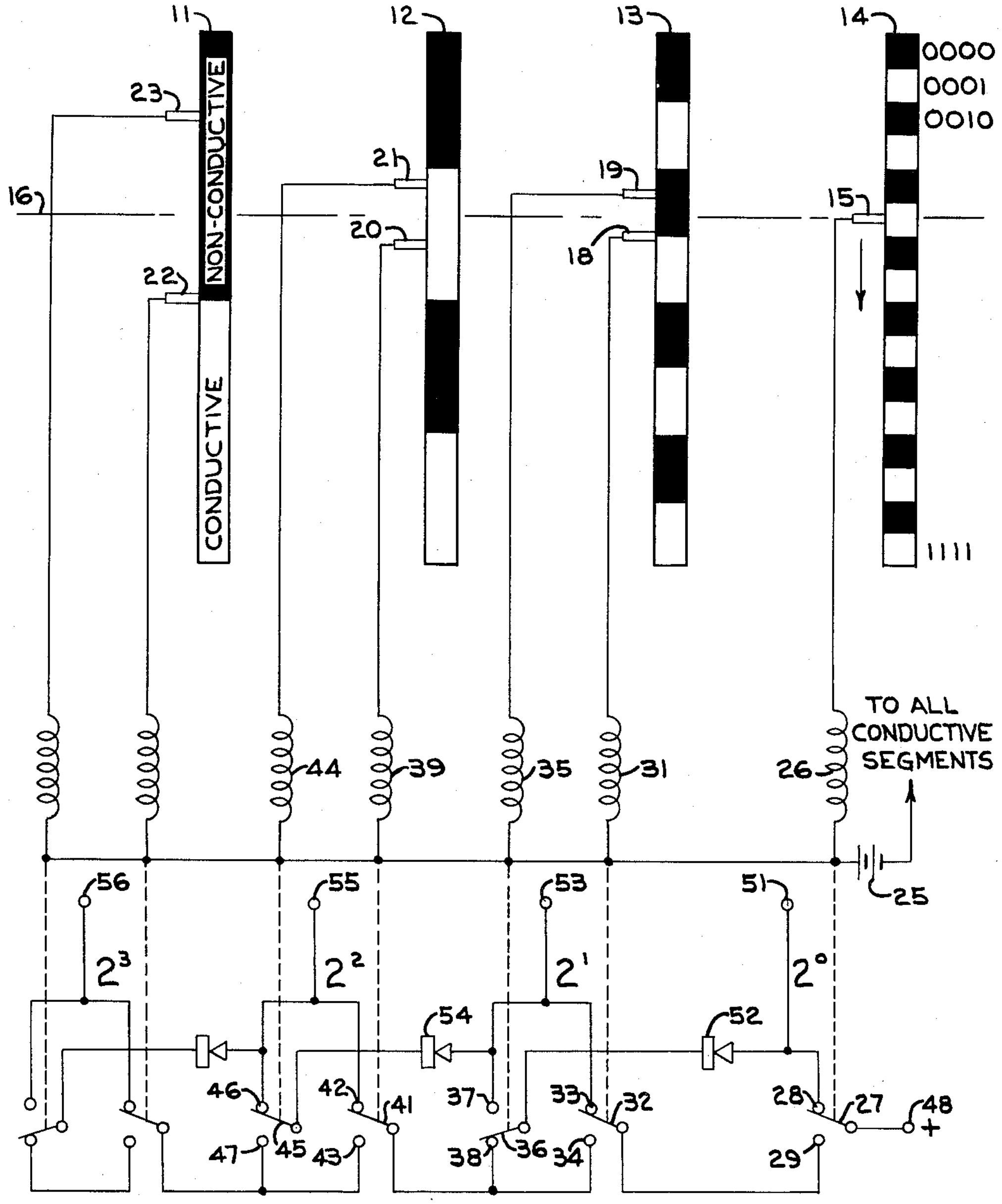
INVENTOR.
LESTER I. GOLDFISCHER
BY H. L. Mackey
ATTORNEY

Patented June 12, 1956

2,750,584

ANALOG TO DIGITAL CONVERTER

Lester I. Goldfischer, Queens Village, N. Y., assignor to General Precision Laboratory Incorporated, a corporation of New York Application March 29, 1954, Serial No. 419,347

4 Claims. (Cl. 340—347)

This invention relates generally to apparatus for converting an analog quantity to a digital quantity, and particularly to an improved arrangement for "reading out" a double brush binary commutator.

An analog to digital converter is an apparatus which converts an analog quantity, such as the angular position of a shaft, to a corresponding digital quantity, such as 37 degrees. Such converters are frequently used to convert measurements of physical quantities to binary digital form in order to take advantage of the high inherent accuracy of binary digital computers. A simple form of analog to binary digital converter may comprise a disk or drum commutator divided into several rings. The first ring consists of one conductive and one nonconductive segment; the next ring consists of two conductive and two nonconductive segments; and each succeeding ring consists of twice the number of conductive and nonconductive segments as the next preceding ring. The commutator is connected for rotation by the shaft the angular position of which is to be converted to a binary digital quantity. All of the conductive segments are electrically connected together and to a source of potential. A row of brushes is provided, one brush bearing on each ring. The presence or absence of potentials on the brushes when read in the proper sequence, is a binary representation of the angular position of the shaft.

A simple converter as above described is subject to the disadvantage that two or more brushes may shift from conductive to nonconductive segments at the same time, so that if the brushes are not perfectly aligned, an incorrect number will be indicated. This disadvantage may be overcome in the manner described in the copending application of John W. Gray, Serial No. 397,905, filed December 14, 1953, for Analog to Digital Converter. The apparatus described in that application employs a single brush on the ring containing the greatest number of segments and a pair of brushes on each remaining ring, one leading and one lagging the normal position. In the case of a five ring commutator, there is a single brush and four pairs of brushes. The potential condition of the single brush and of one brush of each pair represents the desired binary digital quantity. A system of relays is provided to select those five of the nine brushes which represent the correct binary number. That system is relatively slow in operation because the relays operate sequentially. For example, when the indication changes from 00111 to 01000, four relays must operate sequentially before the system is stabilized so as to indicate the correct number.

It is an object of the present invention to provide a system for quickly selecting the proper contacts of a double brush analog to binary digital converter.

Another object of the invention is to provide apparatus for "reading out" a double brush binary digital converter in which the maximum delay is the operation time of one relay.

In accordance with the invention, the potential condition of each brush is repeated by a separate relay which actuates a single pole double throw switch. The contacts are interconnected so that, beginning with the least significant digit, the value of each digit determines which brush of the next preceding pair is used to determine the next digit. By this arrangement the sequential operation of relays is avoided, since each relay operates whenever its corresponding brush changes its potential condition.

For a clearer understanding of the invention, reference may be made to the accompanying drawing the single figure of which is a schematic representation of an analog to digital converter in accordance with the invention.

Referring now to the drawing, there is shown a developed view of a commutator comprising a plurality of rings 11, 12, 13 and 14. It will be understood that these rings are actually arranged contiguously on a cylindrical form which is rotated by the shaft the angular position of which is to be represented by a binary number.

The ring 11 consists of one conductive and one nonconductive segment, the segments being of equal length. The ring 12 consists of two conductive and two nonconductive segments; the ring 13 consists of four conductive and four nonconductive segments; and the ring 14 consists of eight conductive and eight nonconductive segments. A single brush 15 is arranged to bear on the segments of the ring 14 as the commutator is rotated by the input shaft. In the more conventional type of analog to digital converter a single brush would be provided for each of the rings 11, 12 and 13, these brushes being positioned in line with brush 15 in the location shown by the center line 16. However, the present invention is applied to a system like that described in the aforementioned Gray application in which each of the remaining rings is provided with two brushes, one leading and one lagging the normal position. Ring 13 is provided with a leading brush 18 and a lagging brush 19. Ring 12 is provided with a leading brush 20 and a lagging brush 21 and ring 11 is provided with a leading brush 22 and a lagging brush 23. The amount by which each brush leads or lags its normal position is not critical, but must be less than one-half the length of the segments of the ring on which it is bearing. For example, the brush 20 may be displaced from the center line 16 by any amount less than one-half the length of each segment of ring 12. Similarly the brush 22 may be displaced by any amount up to one-half the length of each segment on ring 11. All of the conductive segments are connected together electrically and to a source of potential indicated schematically by the battery 25. The binary digital output is represented by the potential condition of the brush 15 and that of one of each pair of brushes. In the position shown in the drawing, the number is that which would be represented by brushes arranged along the center line 16, that is, 0101. This number is obtained by selecting the proper brush of each pair. As explained in the aforementioned Gray application, the rule for selection of the proper brush is very simple. Starting with the brush representing the least significant digit which, in this case, is brush 15, if this brushes indicates one the next preceding lagging brush is selected while if this brush reads zero the next preceding leading brush is selected. The same rule is followed in selecting the remainder of the brushes. If a selected brush indicates one, the next preceding lagging brush is selected, while if it reads zero the next preceding leading brush is selected. In the position shown in the drawing the brush 15 is on a conductive segment and reads one which tells us to select the next preceding lagging brush which is brush 19. Brush 19 reads zero, so we select the next preceding leading brush which is brush 20. Brush 20 reads one so we select the next preceding lagging brush which is brush 23.

In the Gray application brush selection is made by a system of sequentially operated relays. The first brush operates a relay with a single pole double throw switch which connects the next preceding leading or lagging brush to the circuit. The brush thus selected operates another relay which selects the proper brush of the next preceding pair, and so on. The disadvantage of this arrangement lies in the time required to "read out" the converter. The relays operate sequentially so that, in the most unfavorable case, the time required for "reading out" must be at least as great as the time of operation of one relay multiplied by one less than the number of rings on the commutator. If the commutator has many rings, as is usually the case, the time involved can become quite large.

In the present invention each brush is connected to a separate relay winding. The opposite ends of all the windings are connected together and to the other terminal of the source of potential connected to the commutator segments. Each relay operates a single pole double throw switch having one normally open and one normally closed contact. The brush 15 is connected to a relay winding 26 which operates a switch having an armature 27, a normally open contact 28 and a normally closed contact 29. Similarly brush 18 is connected to a relay winding 31 which operates a switch having an armature 32, a normally open contact 33 and a normally closed contact 34; brush 19 is connected to a relay winding 35 which operates a switch having an armature 36, a normally open contact 37 and a normally closed contact 38; brush 20 is connected to a relay winding 39 which operates a switch having an armature 41, a normally open contact 42 and a normally closed contact 43; brush 21 is connected to a relay winding 44 which operates a switch having an armature 45, a normally open contact 46 and a normally closed contact 47. The foregoing arrangement is continued for as many rings as there may be on the commutator.

The armature 27 associated with the brush 15 is connected to a source of potential represented by the terminal 48. The normally closed contact 29 is connected to the armature 32 which is a part of the switch associated with the leading brush 18. The normally open contact 28 is connected to an output terminal 51 and is also connected through a rectifier 52 to the armature 36 which is associated with the next preceding lagging brush 19.

The normally closed contacts of the switches associated with each pair of brushes are connected together and to the armature of the switch associated with the next preceding leading brush. As shown in the figure, normally closed contacts 34 and 38 are connected together and also connected to the armature 41. The normally open contacts of each pair of switches are connected together, to an output terminal and also connected through a rectifier to the armature of the switch associated with the next preceding lagging brush. In the drawing, these connections are illustrated by the connection together of normally open contacts 33 and 37 which are connected to an output terminal 53 and which are also connected through a rectifier 54 to the armature 45. Similar connections are made for the switches associated with all of the remaining brushes. In addition to output terminals 51 and 53, output terminals 55 and 56 are provided and are connected as above described. The potential condition of these terminals 51, 53, 55 and 56 represents the desired binary digital output. Terminal 56 represents the most significant digit while terminal 51 represents the least significant digit.

In operation, the commutator comprising rings 11, 12, 13 and 14 is rotated by the input shaft and as it rotates the various brushes bearing upon the rings have, or have not, potentials impressed upon them according to whether they bear on conductive or nonconductive segments As soon as any brush bears upon a conductive segment its associated relay operates immediately and independently of the operation of all the other relays. In the position of brushes shown in the drawing, the brush 18 has just started to make contact with a conductive segment and has already energized relay 31, thus moving the armature 32 to make contact with the contact 33. This may be thought of as an advance operation since, at this point, the position of armature 32 is immaterial to the digit indicated by the output terminal 53.

In the position shown, it can be seen by inspection that the proper binary number is 0101 and this number appears on the output terminals as follows: the brush 15 is on a conductive segment so that relay 26 is energized thereby moving armature 27 so that it engages contact 28. The positive potential flows through armature 27 and contact 28 directly to the output terminal 51 thereby indicating digit one. The brush 18 is making contact with a conductive segment so as to energize winding 31 while the winding 35 remains deenergized. Inspection of the drawing shows that no potential can reach output terminal 53 so that this terminal indicates the digit zero.

Brushes 20 and 21 have energized windings 39 and 44 respectively and the positive potential reaches the output terminal 55 through the armature 27, contact 28, rectifier 52, armature 36, contact 38, armature 41, and contact 42 so that terminal 55 indicates the digit one. Inspection of the drawing shows that no potential can reach the output terminal 56 so that this terminal indicates the digit zero.

The rectifiers such as 52 and 54 are necessary to prevent back circuits from placing a potential on those output terminals which should read zero. For example, in the absence of rectifier 54, the potential appearing on output terminal 55 would flow through contact 46 and armature 45 to the output terminal 53. However, the rectifier 54 prevents this erroneous indication.

If the apparatus is connected to an auxiliary system requiring an indication only when a "read out" pulse is applied, such a pulse need only be slightly longer than the operation time of one relay, since all relays required to be energized are connected in parallel and will operate simultaneously.

Although a specific embodiment has been described, many modifications may be made within the scope of the invention. It is obvious that a cylindrical commutator would have the rings closely adjacent or that a disk commutator could be used. In fact, a disk commutator is particularly appropriate because of the increasing tolerance of brush spacing for the rings nearer the center. Many other modifications will occur to those skilled in the art.

What is claimed is:

1. A system for translating the potential condition of all of the brushes of a multi-ring double brush binary converter to a potential condition of a plurality of output conductors equal in number to the number of rings so as to obtain a binary digital output comprising, a relay stage for each ring, the last stage including a single relay having a winding connected to the single brush and a single pole double throw switch operated thereby, each remaining relay stage including first and second relays having windings connected to the leading and lagging brushes respectively and first and second single pole double throw switches operated by said first and second windings respectively, a source of potential connected to the armature of said last stage switch, an output conductor for each stage, means for connecting the normally open contacts of each stage to the corresponding output conductors, means for applying the potential of each output conductor to the armature of the second switch of the next preceding stage, means for preventing the application of the potential of each output conductor to the output conductor of the next succeeding stage and means for applying a potential to the armature of the first switch of each stage only when there is no potential on the output conductor of the next succeeding stage.

2. In an electrical commutator system for representing the angular position of a shaft as the potential condition of a plurality of output conductors in which the commutator includes a plurality of rings of alternately arranged conductive and nonconductive segments and having a pair of brushes bearing on each ring except the ring having the greatest number of segments which ring has but a single brush, an improved apparatus for applying potentials to the output conductors in response to the potential condition of the various brushes comprising an output conductor for each ring, a relay stage for each ring, the stage for the ring having the greatest number of segments comprising a single relay, each remaining stage comprising first and second relays, each relay having an operating winding which, when energized, closes a normally open contact and opens a normally closed contact, means for connecting the operating winding of the last stage relay to the single brush, means for connecting the operating winding of the first and second relays of each remaining stage to the corresponding leading and lagging brushes respectively, a source of potential connected to the armature of the last stage switch, means for connecting the normally open contacts of each stage to the corresponding output conductor, means for connecting each output conductor through a rectifier to the armature of the second switch of the next preceding stage, and means for connecting the normally closed contacts of each stage to the armature of the first switch of the next preceding stage.

3. A system for translating the potential condition of all of the brushes of a multi-ring double brush binary converter to a potential condition of a plurality of output conductors equal in number to the number of rings so as to obtain a binary digital output comprising, a relay stage for each ring, the last stage including a single relay having a winding connected to the single brush and a single pole double throw switch operated thereby, each remaining relay stage including first and second relays having windings connected to the leading and lagging brushes respectively and first and second single pole double throw switches operated by said first and second windings respectively, means for connecting the normally closed contact of said last stage switch to the armature of the first switch of the next preceding stage, means for connecting the normally open contact of said last stage switch to an output conductor and, through a rectifier, to the armature of the second switch of the next preceding stage, a source of potential connected to the armature of said last stage switch, means for connecting the normally closed contacts of the first and second switches of each remaining stage together and to the armature of the first switch of the next preceding stage, and means for connecting the normally open contacts of the first and second switches of each remaining stage together, to an output conductor, and, through a rectifier, to the armature of the second switch of the next preceding stage.

4. Apparatus for representing the angular position of a shaft as a binary digital quantity comprising, a commutator mounted for rotation by said shaft, said commutator comprising a plurality of rings each divided into equal length alternately arranged conductive and nonconductive segments, the number of segments doubling on succeeding rings, a source of potential having one terminal connected to all of said conductive segments, a single brush bearing on the ring having the greatest number of segments, a pair of brushes bearing on each remaining ring, the brushes of each pair being displaced circumferentially in opposite directions from a line through said first brush perpendicular to the circumference of said rings by an amount less than one-half the length of a segment on that ring on which the brushes are bearing, whereby one brush of each pair leads and one lags the normal position, a first relay associated with said single brush, a pair of relays comprising a leading and a lagging relay associated with each pair of brushes, each of said relays having one normally closed contact and one normally open contact, means for connecting each brush to one terminal of the operating winding of its associated relay, means for connecting the other terminal of each winding to the other terminal of said source of potential, means for connecting the normally closed contacts of each pair of relays together and to the movable armature of the next preceding leading relay, means for connecting the normally open contacts of each pair of relays together, to an output terminal, and, through a rectifier, to the movable armature of the next preceding lagging relay, means for connecting the normally closed contact of said first relay to the movable armature of the next preceding leading relay, means for connecting the normally open contact of said first relay to an output conductor and, through a rectifier, to the movable armature of the next preceding lagging relay, and a source of potential connected to the movable armature of said first relay.

References Cited in the file of this patent

UNITED STATES PATENTS

| | | |
|---|---|---|
| 2,405,603 | Parker | Aug. 13, 1946 |
| 2,630,562 | Johnson | Mar. 3, 1953 |
| 2,666,912 | Gow et al. | Jan. 19, 1954 |